US008967636B2

(12) United States Patent
Horst

(10) Patent No.: US 8,967,636 B2
(45) Date of Patent: Mar. 3, 2015

(54) HUBLESS WHEEL AND RELATED STROLLER

(71) Applicant: Andrew J. Horst, West Lawn, PA (US)

(72) Inventor: Andrew J. Horst, West Lawn, PA (US)

(73) Assignee: Wonderland Nurserygoods Company Limited, Kwai Chung, N.T. (HK)

( * ) Notice: Subject to any disclaimer, the term of this patent is extended or adjusted under 35 U.S.C. 154(b) by 31 days.

(21) Appl. No.: 13/778,137

(22) Filed: Feb. 27, 2013

(65) Prior Publication Data

US 2013/0228989 A1 Sep. 5, 2013

Related U.S. Application Data

(60) Provisional application No. 61/634,615, filed on Mar. 2, 2012.

(51) Int. Cl.
| | | |
|---|---|---|
| *B62B 7/00* | (2006.01) | |
| *B60B 19/00* | (2006.01) | |
| *B62B 7/04* | (2006.01) | |

(52) U.S. Cl.
CPC . *B60B 19/00* (2013.01); *B62B 7/04* (2013.01); *B60B 2900/112* (2013.01); *B60B 2900/113* (2013.01); *B60B 2900/116* (2013.01); *B60B 2900/351* (2013.01)
USPC .......................................... 280/47.38; 301/5.1

(58) Field of Classification Search
CPC .... B60B 19/00; B60B 33/0028; B60B 3/048; B62B 7/00
USPC ............. 305/7; 301/5.1; 280/47.38, 642, 647, 280/650
See application file for complete search history.

(56) References Cited

U.S. PATENT DOCUMENTS

| 978,161 | A | | 12/1910 | Holmes | |
|---|---|---|---|---|---|
| 2,843,426 | A | * | 7/1958 | Nojima | .......................... 301/5.1 |
| 2,996,306 | A | * | 8/1961 | Johnson | ................... 280/11.115 |
| 3,329,444 | A | * | 7/1967 | Lidov | ............................ 280/210 |
| 3,663,031 | A | * | 5/1972 | Young | ........................ 280/11.24 |
| 4,045,096 | A | * | 8/1977 | Lidov | ................................ 305/7 |

(Continued)

FOREIGN PATENT DOCUMENTS

| DE | 38 19 925 A1 | 4/1989 |
|---|---|---|
| DE | 202 03 348 U1 | 8/2002 |

(Continued)

OTHER PUBLICATIONS

"Segway-based 'O' pram/stroller touts gyroscopic mechanism", dated Jun. 14, 2010, Designbuzz, http://www.designbuzz.com/segway-based-o-pramstroller-touts-gyroscopic-mechanism/.

(Continued)

*Primary Examiner* — Hau Phan
*Assistant Examiner* — Jacob Meyer
(74) *Attorney, Agent, or Firm* — Winston Hsu; Scott Margo

(57) ABSTRACT

A stroller includes a frame and a plurality of hubless wheels. A seat is disposed on the frame. The hubless wheels are disposed on the frame. The hubless wheel includes a rim, an internal sliding structure and at least one bridging component. A tire is disposed on the hubless wheel. The rim has an external sliding structure on an inner surface of the rim. The internal sliding structure is disposed inside the external sliding structure. The bridging component is disposed between the external sliding structure and the internal sliding structure. The bridging component revolves on its own axis.

18 Claims, 8 Drawing Sheets

(56) References Cited

U.S. PATENT DOCUMENTS

| | | | | |
|---|---|---|---|---|
| 4,363,493 | A * | 12/1982 | Veneklasen | 280/11.204 |
| 5,071,196 | A * | 12/1991 | Sbarro | 301/5.1 |
| 5,248,019 | A * | 9/1993 | Sbarro | 180/219 |
| 5,419,619 | A * | 5/1995 | Lew | 301/5.1 |
| 5,826,674 | A * | 10/1998 | Taylor | 180/219 |
| 6,224,080 | B1 * | 5/2001 | Ross | 280/281.1 |
| 6,705,630 | B1 * | 3/2004 | Karpman | 280/253 |
| 6,839,939 | B2 * | 1/2005 | Donakowski | 16/45 |
| 7,014,272 | B1 * | 3/2006 | Williamson et al. | 301/5.1 |
| 7,426,970 | B2 * | 9/2008 | Olsen | 180/65.1 |
| 7,657,969 | B2 * | 2/2010 | Trivini | 16/45 |
| 7,980,568 | B2 * | 7/2011 | Chen | 280/11.24 |
| 8,113,524 | B2 * | 2/2012 | Karpman | 280/63 |
| 8,376,378 | B2 * | 2/2013 | Keel | 280/87.042 |
| 8,464,822 | B2 * | 6/2013 | Spector et al. | 180/219 |
| 8,523,212 | B2 * | 9/2013 | Ryan et al. | 280/287 |
| 8,746,383 | B2 * | 6/2014 | Basadzishvili | 180/65.51 |
| 2002/0178539 | A1 | 12/2002 | Donakowski | |
| 2004/0036248 | A1 * | 2/2004 | Karpman | 280/253 |
| 2007/0143958 | A1 * | 6/2007 | Trivini | 16/45 |
| 2007/0209855 | A1 * | 9/2007 | Burkiewicz | 180/223 |
| 2010/0306962 | A1 | 12/2010 | Breyer | |
| 2011/0074127 | A1 * | 3/2011 | Karpman | 280/63 |
| 2011/0181014 | A1 * | 7/2011 | Ryan et al. | 280/263 |
| 2011/0209938 | A1 * | 9/2011 | Basadzishvili | 180/305 |
| 2012/0175179 | A1 * | 7/2012 | Spector et al. | 180/219 |
| 2013/0087983 | A1 * | 4/2013 | Ngai | 280/87.041 |

FOREIGN PATENT DOCUMENTS

| | | |
|---|---|---|
| FR | 2 705 617 A1 | 12/1994 |
| GB | 967915 | 8/1964 |
| WO | 2010005433 A1 | 1/2010 |

OTHER PUBLICATIONS

Idiot, "The Official Hubless Wheel hater thread", dated Aug. 15, 2011, 12th post on page, Core77, http://boards.core77.com/viewtopic.php?f=22&t=21102&start=180.

* cited by examiner

HUBLESS WHEEL AND RELATED STROLLER

CROSS REFERENCE TO RELATED APPLICATIONS

This application claims the benefit of priority of U.S. Provisional Application No. 61/634,615, filed on 2 Mar., 2012, which is incorporated herein by reference.

BACKGROUND OF THE INVENTION

1. Field of the Invention

The present invention relates to a stroller for a child, and more particularly, to a stroller with hubless wheels for low material and production costs and adjustable ground clearance.

2. Description of the Prior Art

A conventional wheel includes a hub portion disposed inside a rim of the wheel. The hub portion is the central pivot of the wheel and further a connection between the rim and a frame of the stroller. The hub portion is expensive, both material and production costs, and a weight of the wheel is increased due to the weight amount of the hub portion and the rim. Besides, ground clearance of the frame is designed according position of a pivot hole formed on the hub portion. A diameter of the wheel is varied to adjust the ground clearance of the frame, which results in complicated assembly procedures and extra manufacturing cost. Therefore, design of a new-typed wheel with advantages of easy adjustment of ground clearance and economy of material and cost is an important issue in the stroller industry.

SUMMARY OF THE INVENTION

The present invention provides a stroller with hubless wheels for low material and production costs and adjustable ground clearance for solving above drawbacks.

According to the claimed invention, a hubless wheel includes a rim, an internal sliding structure and at least one bridging component. A tire is disposed on the hubless wheel. The rim has an external sliding structure on an inner surface. The internal sliding structure is disposed inside the external sliding structure. The bridging component is disposed between the external sliding structure and the internal sliding structure. The bridging component revolves on its own axis.

According to the claimed invention, the external sliding structure and the internal sliding structure are annular structures contoured to fit the rim.

According to the claimed invention, a radius of the external sliding structure is substantially equal to an amount of a radius of the internal sliding structure and a diameter of the bridging component.

According to the claimed invention, the hubless wheel further includes a cover disposed on the bridging component and mantling over the external sliding structure and the internal sliding structure.

According to the claimed invention, the hubless wheel further includes a plurality of bridging components separately disposed between the external sliding structure and the internal sliding structure. A mounting junction of the hubless wheel and a frame of the stroller is disposed over the corresponding bridging component and corresponding position of the internal sliding structure to adjust a height of the mounting junction relative to the ground whereon the stroller is located.

According to the claimed invention, the bridging component is a contoured roller. The internal sliding structure is connected to a frame of the stroller. The contoured roller includes a first engaging portion, the external sliding structure includes a second engaging portion, and the internal sliding structure includes a third engaging portion. The second engaging portion and the third engaging portion are simultaneously engaged with opposite sides of the first engaging portion.

According to the claimed invention, the first engaging portion is a concave, and the second engaging portion and the third engaging portion respectively are protrusions matched with the concave.

According to the claimed invention, the bridging component is a bearing assembly connected to a frame of the stroller. The bearing assembly includes a plurality of shafts and a fixing component. The shafts are rotatably disposed on an inner surface and an outer surface of the internal sliding structure. The fixing component is disposed on the plurality of shafts to fix relative position of the shafts.

According to the claimed invention, the internal sliding structure is a T-shaped track integrated with the external sliding structure monolithically, and an upper part of the T-shaped track is buckled between the shafts.

According to the claimed invention, the hubless wheel further includes an electric generator disposed on the bridging component to create electric power when the hubless wheel moves.

According to the claimed invention, a stroller includes a frame and a plurality of hubless wheels. A seat is disposed on the frame. The hubless wheels are disposed on the frame. Each hubless wheel includes a rim, an internal sliding structure and at least one bridging component. The rim has an external sliding structure on an inner surface, and a tire is disposed on an outer surface of the rim. The internal sliding structure is disposed inside the external sliding structure. The bridging component is disposed between the external sliding structure and the internal sliding structure. The bridging component revolves on its own axis.

The hubless wheel of the present invention utilizes a combination of the external sliding structure, the internal sliding structure and the bridging components to replace the conventional hub portion, so as to effectively decrease the material weight, the number of parts, and the product cost, and further to increase structural strength of the rim by the sliding structures. According to the first embodiment, the external sliding structure rotates relative to the immobile internal sliding structure to revolve the bridging components, and the frame is attached to the internal sliding structure for connection of the hubless wheel and the frame. According to the second embodiment, the hubless wheel rotates to drive the bearing assembly to slide along the gap between the sliding structures, which means the shaft of the bearing assembly can revolve and move around the sliding structures. The external sliding structure and the internal sliding structure synchronously rotate due to the integrated connection, relative motion of the bridging component to the sliding structures drives the stroller to move on, and the frame is attached to the fixing component of the bearing assembly.

The hubless wheel of the present invention does not use the central hub portion, and the sliding structures and the bridging components are applied to rotatably install the hubless wheel on the frame of the stroller. In the present invention, the sliding structures that house the contoured rollers (or the shafts) are disposed around the inner surface of the rim to form the mounting junction between the hubless wheel and the frame. The hubless wheel of the present invention has advantages of material economy for low cost and low weight, movable mounting junction for adjustable ground clearance, and additional power generating function for automatic drive and illumination, so as to increase operation convenience and market competition of the product.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
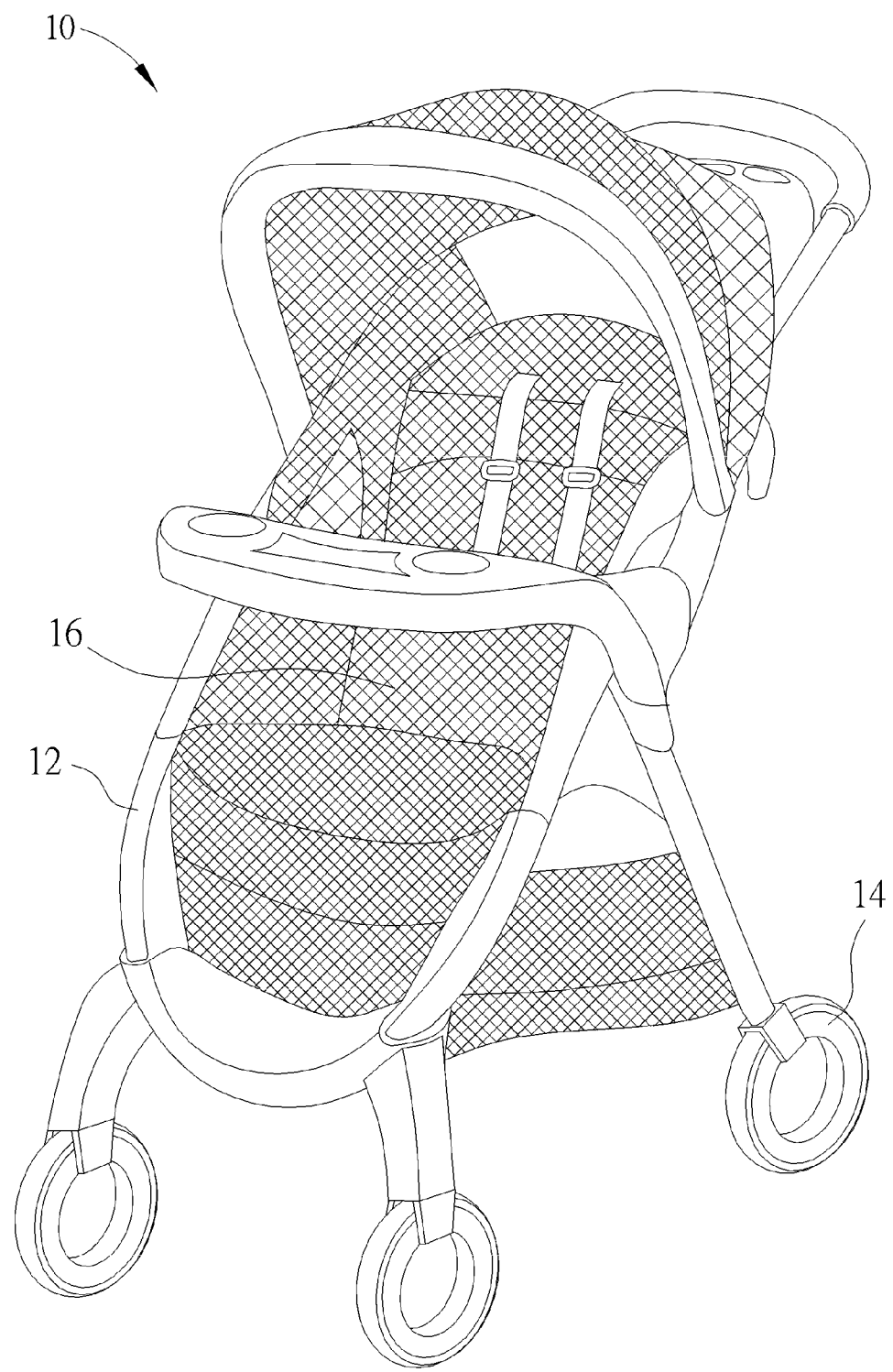
FIG. 1 is a diagram of a stroller according to an embodiment of the present invention.

Please refer to FIG. 1. FIG. 1 is a diagram of a stroller 10 according to an embodiment of the present invention. The stroller 10 includes a frame 12 and a plurality of hubless wheels 14. The hubless wheel 14 is disposed on a bottom of the frame 12 whereon a seat 16 is disposed. The hubless wheel 14 is a hollow structure without a conventional hub portion, which can effectively decrease the material weight, the number of parts, and the product cost. The hubless wheel 14 includes a rim, a sliding structure and several bridging components. The bridging components are disposed between the rim and the sliding structure, to be as rotary media for allowance of relative rotation between the rim and the sliding structure. Detailed description of the hubless wheel 14 is introduced as following.

Figure 2:
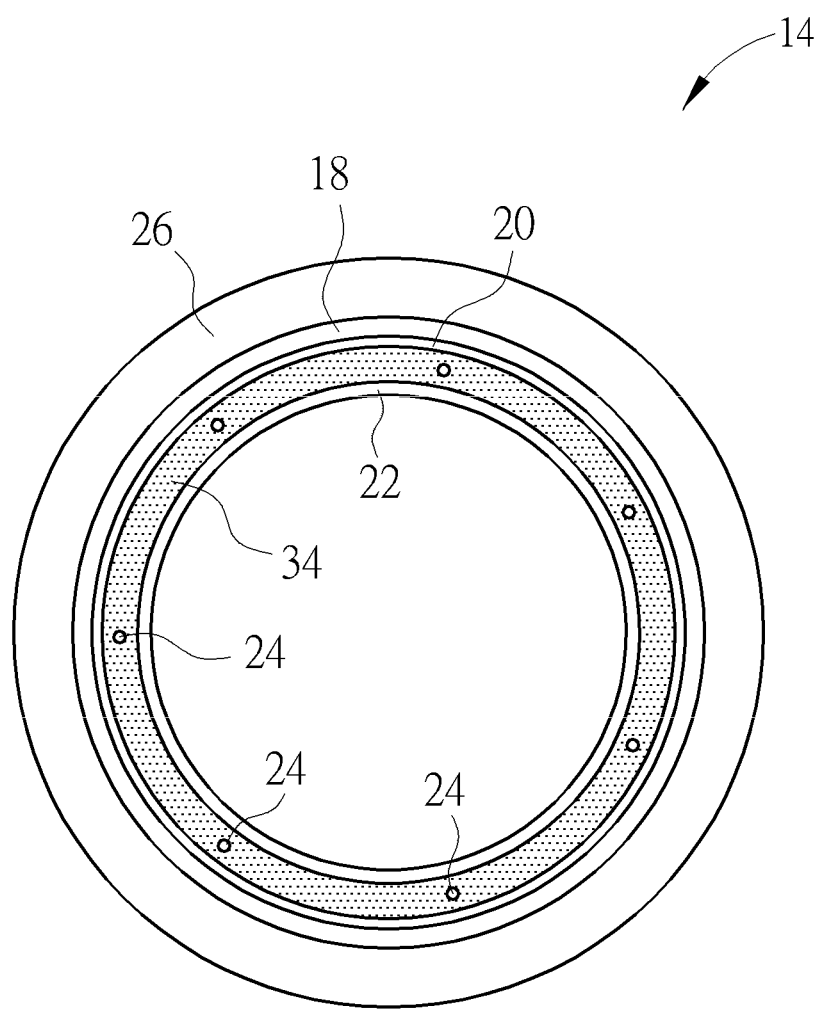
FIG. 2 and FIG. 3 respectively are diagrams of a hubless wheel in different views according to a first embodiment of the present invention.
Figure 3:
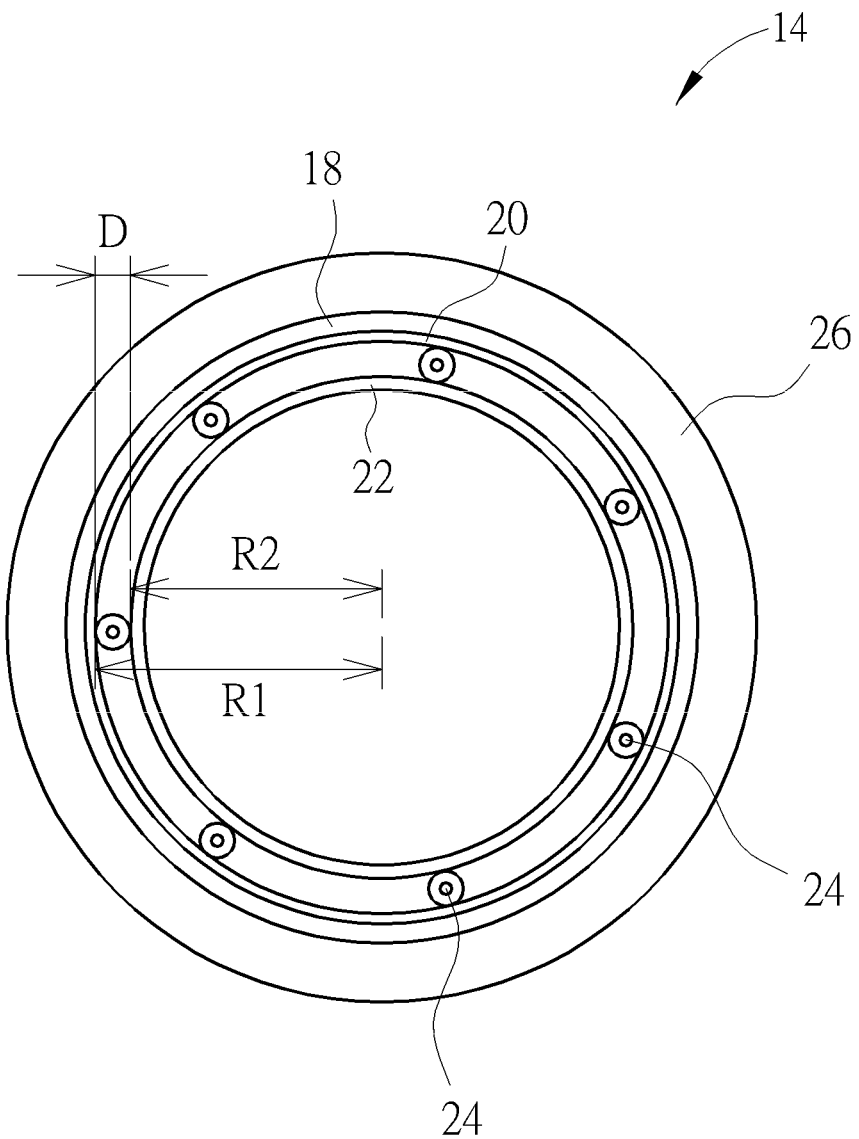

Please refer to FIG. 2 and FIG. 3. FIG. 2 and FIG. 3 respectively are diagrams of the hubless wheel 14 in different views according to a first embodiment of the present invention. The hubless wheel 14 includes a rim 18 having an external sliding structure 20, an internal sliding structure 22 and at least one bridging component 24. A tire 26 can be disposed around the rim 18 for shock absorption of the stroller 10. The external sliding structure 20 is disposed on an inner surface of the rim 18, the bridging components 24 are disposed between the external sliding structure 20 and the internal sliding structure 22, and then the internal sliding structure 22 is disposed inside the external sliding structure 20 in a non-contact manner. The external sliding structure 20 and the internal sliding structure 22 are annular structures contoured to fit the rim 18, so as to prevent the sliding structures and the bridging components from separation.

Figure 4:
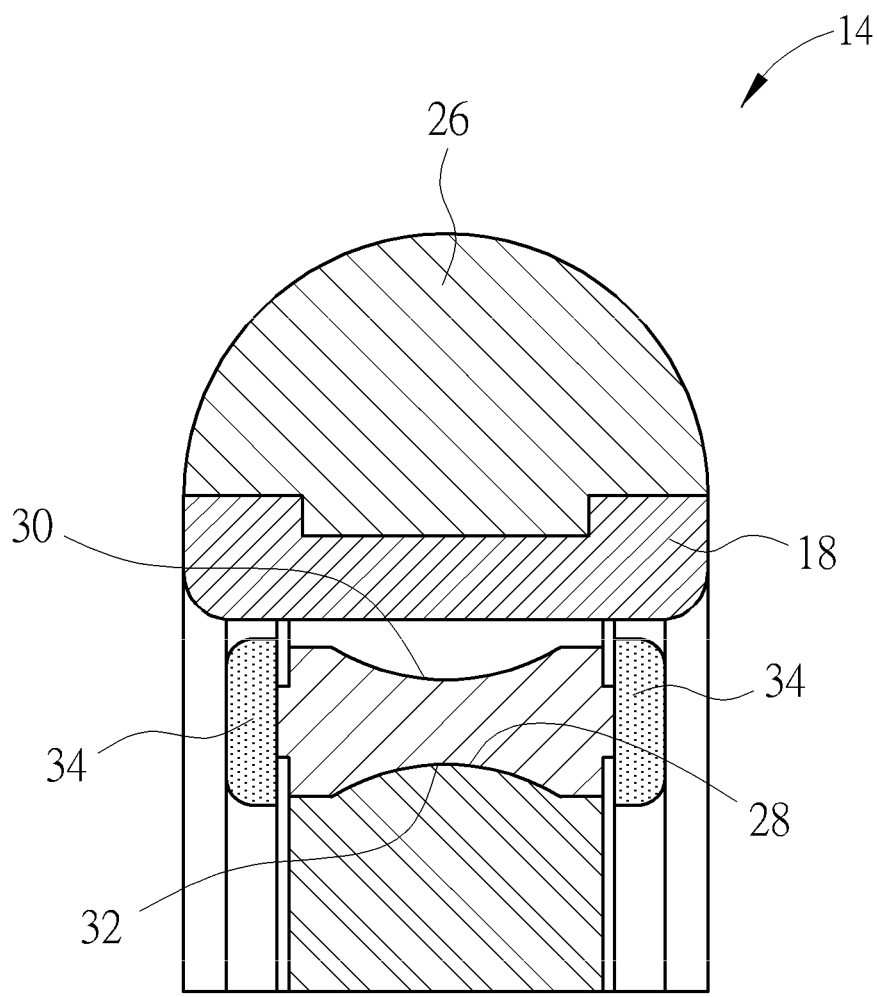
FIG. 4 is a sectional view of the hubless wheel according to the first embodiment of the present invention.

Please refer to FIG. 2 to FIG. 4. FIG. 4 is a sectional view of the hubless wheel 14 according to the first embodiment of the present invention. In the first embodiment, the bridging component 24 can be a contoured roller including a first engaging portion 28, such as a concave, the external sliding structure 20 and the internal sliding structure 22 respectively include a second engaging portion 30 and a third engaging portion 32, such as protrusions. As shown in FIG. 2 to FIG. 4, the internal sliding structure 22 is connected to the frame 12 of the stroller 10, the second engaging portion 30 and the third engaging portion 32 are simultaneously engaged with opposite sides of the first engaging portion 28, so that the internal sliding structure 22 can be stably suspended inside the rim 18 because the bridging component 24 tightly abuts against the external sliding structure 20 and the internal sliding structure 22.

It is to say, a radius R1 of the external sliding structure 20 is substantially equal to an amount of a radius R2 of the internal sliding structure 22 and a diameter D of the bridging component 24. Generally, the hubless wheel 14 includes a plurality of bridging components 24 rotatably disposed between the external sliding structure 20 and the internal sliding structure 22. The bridging components 24 are distributed around the perimeter of the internal sliding structure 22 separately and evenly. Due to the engagement of the concave of the first engaging portion 28 and the protrusions of the second engaging portion 30 and the third engaging portion 32, position of each bridging component 24 relative to the external sliding structure 20, the internal sliding structure 22 and the other bridging components 24 can be preferably immovable.

Although in the present case shows an example of the first engaging portion 28 being a concave, and the second engaging portion 30 and the third engaging portion 32 being protrusions, it is obvious that the first engaging portion 28 may be a protrusion, and the second engaging portion 30 and the third engaging portion 32 are concaves matched to the protrusion. Structural design capable of matching the first engaging portion 28 with the second engaging portion 30 and the third engaging portion 32 belongs to scope of the present invention, and a detailed description is omitted herein for simplicity.

Further, the hubless wheel 14 can include at least one cover 34 disposed on the bridging components 24 to cover an area located between the external sliding structure 20 and the internal sliding structure 22. The cover 34 is an annular slice to mantle over the external sliding structure 20 and the internal sliding structure 22, which can prevent the area between the sliding structures from pollution by dust, and also show preferred aesthetic appearance.

The internal sliding structure 22 is connected to the frame 12 for setting position of the hubless wheel 14 relative to the stroller 10. Due to the tight engagement of the bridging components 24 between the external sliding structure 20 and the internal sliding structure 22, as the bridging component 24 revolves on its own axis, the external sliding structure 20 rotates relative to the internal sliding structure 22, so as to move the stroller 10 forward or backward.

Figure 5:
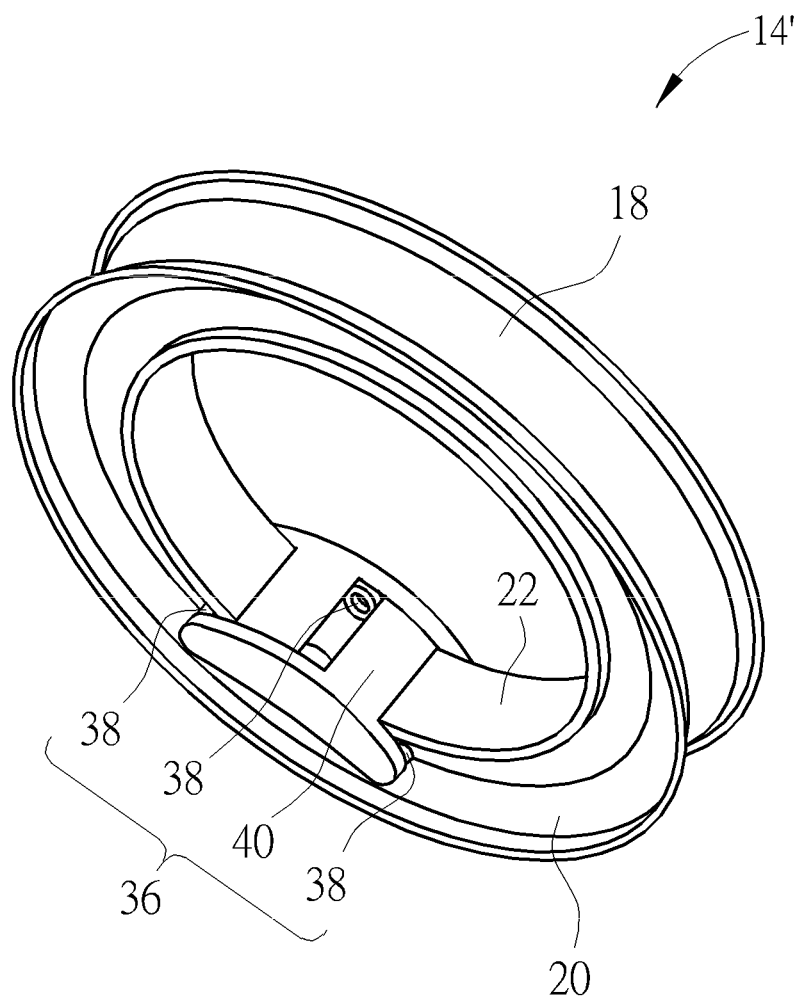
FIG. 5 is a diagram of the hubless wheel according to a second embodiment of the present invention.
Figure 6:
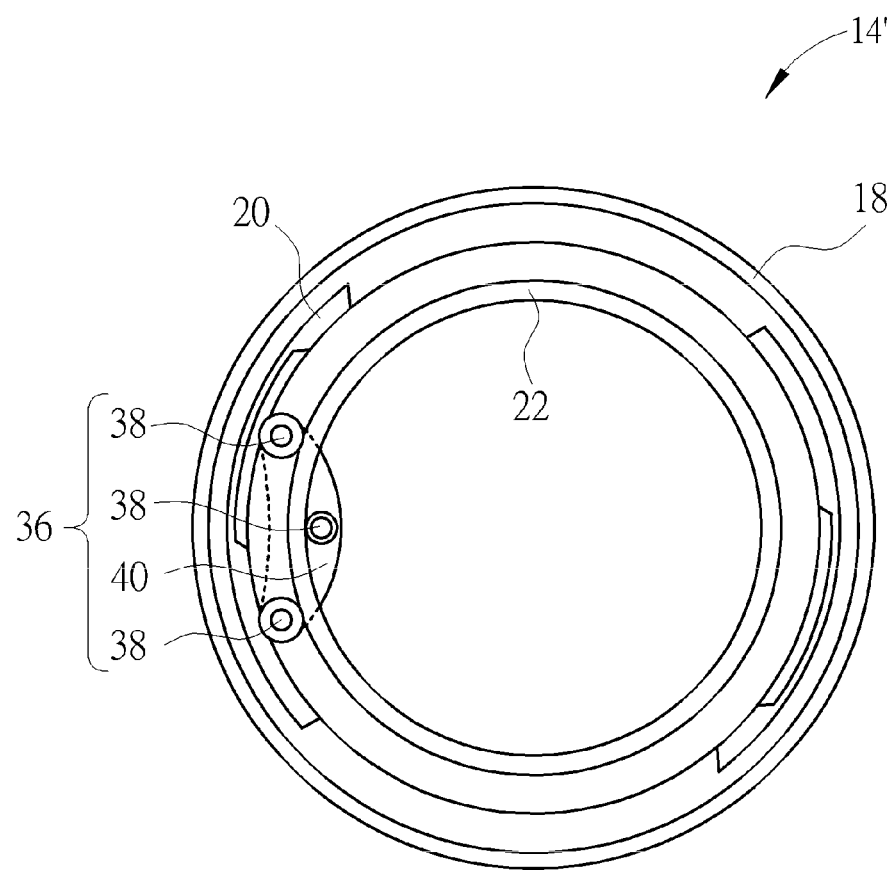
FIG. 6 is a lateral view of the hubless wheel according to the second embodiment of the present invention.

Please refer to FIG. 5 and FIG. 6. FIG. 5 is a diagram of the hubless wheel 14' according to a second embodiment of the present invention. FIG. 6 is a lateral view of the hubless wheel 14' according to the second embodiment of the present invention. In the second embodiment, elements having the same numerals as ones of the first embodiment have the same structures and functions, and detailed description is omitted herein for simplicity. Difference between the second embodiment and the first embodiment is that the bridging component 24 can be a bearing assembly 36 attached to the frame 12 of the stroller 10. The bearing assembly 36 includes a plurality of shafts 38 and a fixing component 40. The shafts 38 are rotatably disposed on inner surface and an outer surface of the internal sliding structure 22, which means the internal sliding structure 22 is captured by the shafts 38. The fixing component 40 is disposed on the shafts 38 and connected to the frame 12 in a manner that does not interfere with rotation of the hubless wheel 14'.

As shown in FIG. 5, the internal sliding structure 22 can be a T-shaped track integrated with the external sliding structure 20 monolithically. A bottom part of the T-shaped track is connected to the external sliding structure 20, so as to reduce the assembly cost and to increase structural strength of connection between the hubless wheel 14' and the frame 12. An upper (and wide) part of the T-shaped track is buckled by the shaft 38, so the T-shaped track further can prevent the bearing assembly 36 from separation from the rim 18. The shafts 38 revolve on their own axes respectively along a gap formed between the external sliding structure 20 and the internal sliding structure 22. Preferably, the fixing component 40 is disposed on the shafts 38 respectively revolving on opposite surfaces of the internal sliding structure 22, to effectively constrain the bearing assembly 36 from unpredictable movement and to steady relative motion of the shafts 38.

Figure 7:
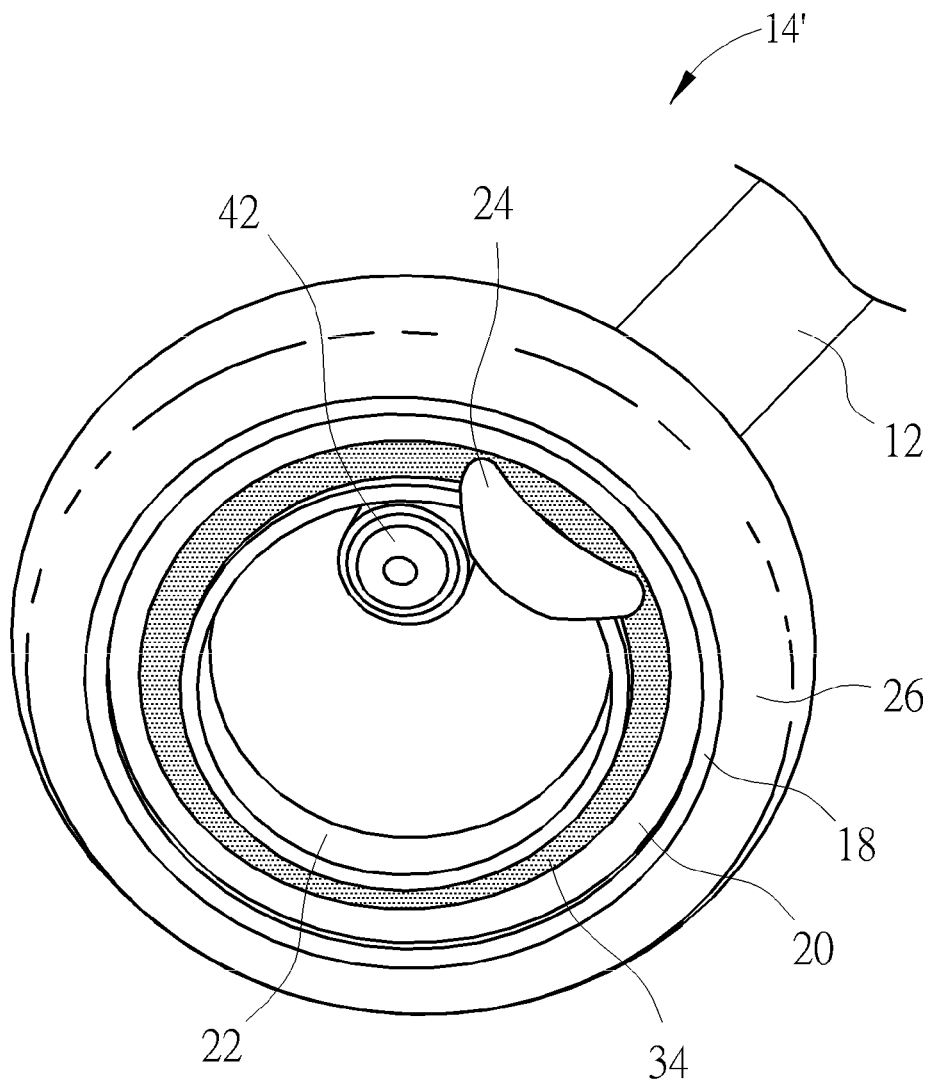
FIG. 7 is a diagram of the stroller with power generating function according to the second embodiment of the present invention.

In the present invention, the hubless wheel 14' can further include an electric generator 42 disposed on the bridging component 24. Please refer to FIG. 7. FIG. 7 is a diagram of the stroller 10 with power generating function according to the second embodiment of the present invention. An input shaft (not shown in figures) of the electric generator 42 can contact and rotate along an ideal surface of the internal sliding structure 22, and the ideal surface preferably can be the inner surface of the internal sliding structure 22. Due to the natural gear ratio of the large hubless wheel 14' to the relatively small input shaft of the electric generator 42, one rotation of the hubless wheel 14' can generate many rotations of the input shaft of the electric generator 42, so that the electric generator 42 can create electric power when the hubless wheel 14' moves. The stored electric power can be outputted reversely through the electric generator 42 to drive the hubless wheel 14' to move on and to actuate a lighting unit (eg. LED) for illumination, selectively. Application of the electric generator 42 is not limited to the above-mentioned embodiments.

In the second embodiment, the middle shaft 38 of the bearing assembly 36 can be replaced by the input shaft of the electric generator 42 to reduce number of the components and to decrease the product cost of the hubless wheel 14'. Likewise, the contoured roller (the bridging component 24) in the first embodiment can further be replaced by the input shaft of the electric generator 42 for economy of the product cost. Functions of replacement of the input shaft in the above-mentioned embodiments are identical to each other, and detailed description is omitted herein for simplicity.

Figure 8:
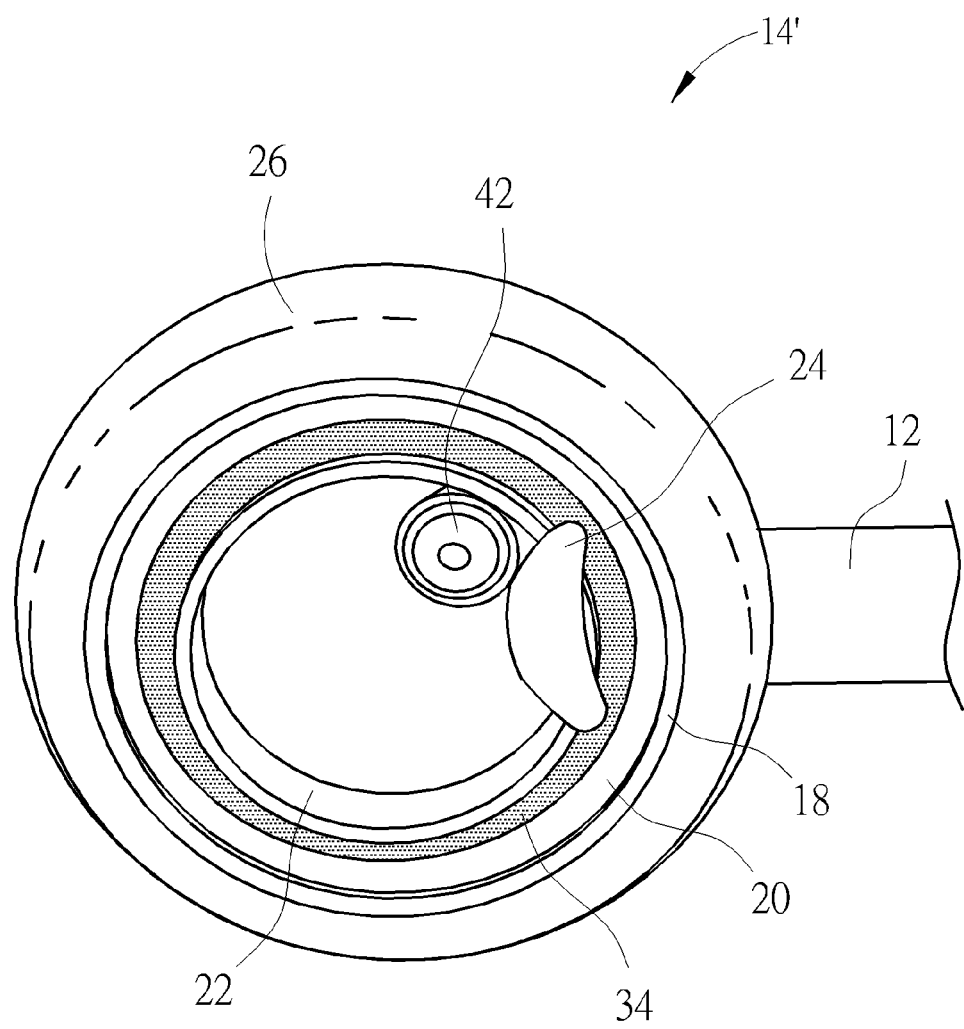
FIG. 8 is a diagram of the hubless wheel illustrating different ground clearance than the one in FIG. 7.

It should be mentioned that ground clearance of the stroller 10 of the present invention can be adjusted conveniently. The ground clearance represents a height of a mounting junction (between the hubless wheel 14 and the frame 12) relative to the ground whereon the stroller 10 is located. Please refer to FIG. 7 and FIG. 8. FIG. 8 is a diagram of the hubless wheel 14 illustrating different ground clearance than the one in FIG. 7. Because the mounting junction is not located at the middle (such as the conventional hub portion) of the wheel, the ground clearance of the stroller 10 is adjustable by altering position of the mounting junction. In the first embodiment, the frame 12 is fixed on the internal sliding structure 22 to form the mounting junction. Selection of the fixing position on the internal sliding structure 22 corresponds to different ground clearance. In the second embodiment, the frame 12 is fixed on the fixing component 40 of the bearing assembly 36 to form the mounting junction. Selection of the clamping position on the internal sliding structure 22 corresponds to different ground clearance. The mounting junction can be disposed on the top of the hubless wheel 14 for high ground clearance, as shown in FIG. 7. The mounting junction can further be disposed on the front of the hubless wheel 14 for medium ground clearance, as shown in FIG. 8.

It should be noticed that although the external sliding structure 20 is shown being disposed on the rim 18 as a unity to reduce the number of parts, they may be formed separately in accordance with particular designs. Likewise, the amount of the bridging components 24 and the amount of the shafts 38 are not limited as the examples shown in the present application.

In conclusion, the hubless wheel of the present invention utilizes a combination of the external sliding structure, the internal sliding structure and the bridging components to replace the conventional hub portion, so as to effectively decrease the material weight, number of parts, and the product cost, and further to increase structural strength of the rim by the sliding structures. According to the first embodiment, the external sliding structure rotates relative to the immobile internal sliding structure to revolve the bridging components, and the frame is attached to the internal sliding structure for connection of the hubless wheel and the frame. According to the second embodiment, the hubless wheel rotates to drive the bearing assembly to revolve along the gap between the sliding structures, which means the shaft of the bearing assembly can revolve and make the sliding structures move. The external sliding structure and the internal sliding structure synchronously rotate due to the integrated connection, relative motion of the bridging component to the sliding structures drives the stroller to move on, and the frame is attached to the fixing component of the bearing assembly.

Comparing to the prior art, the hubless wheel of the present invention does not use the central hub portion, and the sliding structures and the bridging components are applied to rotatably install the hubless wheel on the frame of the stroller. In the present invention, the sliding structures that house the contoured rollers (or the shafts) are disposed around the inner surface of the rim to form the mounting junction between the hubless wheel and the frame. The hubless wheel of the present invention has advantages of material economy for low cost and low weight, movable mounting junction for adjustable ground clearance, and additional power generating function for automatic drive and illumination, so as to increase operation convenience and market competition of the product.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A hubless wheel applied to a stroller, the hubless wheel comprising:
   a rim whereon a tire is disposed, having an external sliding structure on an inner surface of the rim;
   an internal sliding structure disposed inside the external sliding structure; and
   at least one bridging component disposed between the external sliding structure and the internal sliding structure, wherein the bridging component is a bearing assembly connected to a frame of the stroller, the bearing assembly comprises:
     a plurality of shafts rotatably disposed on an inner surface and an outer surface of the internal sliding structure; and
     a fixing component disposed on the plurality of shafts to fix relative position of the shafts.

2. The hubless wheel of claim 1, wherein the external sliding structure and the internal sliding structure are annular structures contoured to fit the rim.

3. The hubless wheel of claim 1, wherein a radius of the external sliding structure is substantially equal to an amount of a radius of the internal sliding structure and a diameter of the bridging component.

4. The hubless wheel of claim 1, further comprising:
a cover disposed on the bridging component and mantling over the external sliding structure and the internal sliding structure.

5. The hubless wheel of claim 1, wherein the hubless wheel further comprises a plurality of bridging components separately disposed between the external sliding structure and the internal sliding structure, a mounting junction of the hubless wheel and a frame of the stroller is disposed over the corresponding bridging component and corresponding position of the internal sliding structure to adjust a height of the mounting junction relative to the ground whereon the stroller is located.

6. The hubless wheel of claim 1, wherein the bridging component is a contoured roller, the internal sliding structure is connected to a frame of the stroller, the contoured roller comprises a first engaging portion, the external sliding structure comprises a second engaging portion, the internal sliding structure comprises a third engaging portion, the second engaging portion and the third engaging portion are simultaneously engaged with opposite sides of the first engaging portion.

7. The hubless wheel of claim 6, wherein the first engaging portion is a concave, and the second engaging portion and the third engaging portion respectively are protrusions matched with the concave.

8. The hubless wheel of claim 1, wherein the internal sliding structure is a T-shaped track integrated with the external sliding structure monolithically, and an upper part of the T-shaped track is buckled by the shafts.

9. The hubless wheel of claim 1, further comprising:
an electric generator disposed on the bridging component to create electric power when the hubless wheel moves.

10. A stroller for a child, the stroller comprising:
a frame whereon a seat is disposed; and
a plurality of hubless wheels disposed on the frame, each hubless wheel comprises:
 a rim having an external sliding structure on an inner surface, a tire being disposed on an outer surface of the rim;
 an internal sliding structure disposed inside the external sliding structure; and
 at least one bridging component disposed between the external sliding structure and the internal sliding structure, wherein the bridging component is a bearing assembly connected to a frame of the stroller, the bearing assembly comprises:
  a plurality of shafts rotatable disposed on an inner surface and an outer surface of the internal sliding structure; and
  a fixing component disposed on the plurality of shafts to fix relative position of the shafts.

11. The stroller of claim 10, wherein the external sliding structure and the internal sliding structure are annular structures contoured to fit the rim.

12. The stroller of claim 10, wherein a radius of the external sliding structure is substantially equal to an amount of a radius of the internal sliding structure and a diameter of the bridging component.

13. The stroller of claim 10, wherein the hubless wheel comprises:
a cover disposed on the bridging component and mantling over the external sliding structure and the internal sliding structure.

14. The stroller of claim 10, wherein the hubless wheel further comprises a plurality of bridging components separately disposed between the external sliding structure and the internal sliding structure, a mounting junction of the hubless wheel and a frame of the stroller is disposed over the corresponding bridging component and corresponding position of the internal sliding structure to adjust a height of the mounting junction relative to the ground whereon the stroller is located.

15. The stroller of claim 10, wherein the bridging component is a contoured roller, the internal sliding structure is connected to a frame of the stroller, the contoured roller comprises a first engaging portion, the external sliding structure comprises a second engaging portion, the internal sliding structure comprises a third engaging portion, the second engaging portion and the third engaging portion are simultaneously engaged with opposite sides of the first engaging portion.

16. The stroller of claim 15, wherein the first engaging portion is a concave, and the second engaging portion and the third engaging portion respectively are protrusions matched with the concave.

17. The stroller of claim 10, wherein the internal sliding structure is a T-shaped track integrated with the external sliding structure monolithically, and an upper part of the T-shaped track is buckled by the shafts.

18. The stroller of claim 10, wherein the hubless wheel comprises:
an electric generator disposed on the bridging component to create electric power when the hubless wheel moves.

* * * * *